(12) United States Patent
Huang

(10) Patent No.: US 9,229,176 B2
(45) Date of Patent: Jan. 5, 2016

(54) OPTICAL FIBER CONNECTOR

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/215,023

(22) Filed: Mar. 16, 2014

(65) Prior Publication Data

US 2015/0139591 A1 May 21, 2015

(30) Foreign Application Priority Data

Nov. 19, 2013 (TW) .............................. 102142141 A

(51) Int. Cl.
G02B 6/36 (2006.01)
G02B 6/38 (2006.01)
G02B 6/44 (2006.01)

(52) U.S. Cl.
CPC ............ G02B 6/3885 (2013.01); G02B 6/3887 (2013.01); G02B 6/443 (2013.01); *G02B 6/387* (2013.01); *G02B 6/3839* (2013.01)

(58) Field of Classification Search
None
See application file for complete search history.

(56) References Cited

U.S. PATENT DOCUMENTS

| 4,045,121 | A  | * | 8/1977  | Clark .............................. 385/58 |
| 4,715,675 | A  | * | 12/1987 | Kevern et al. ................... 385/80 |
| 5,076,656 | A  | * | 12/1991 | Briggs et al. .................... 385/71 |
| 6,398,424 | B1 | * | 6/2002  | Jin et al. .......................... 385/83 |
| 7,210,855 | B2 | * | 5/2007  | Rossi et al. ..................... 385/53 |
| 2012/0251052 | A1 | * | 10/2012 | Hsu .................................. 385/74 |
| 2013/0148927 | A1 | * | 6/2013  | Chen et al. ..................... 385/50 |
| 2015/0093077 | A1 | * | 4/2015  | Huang ............................ 385/76 |

FOREIGN PATENT DOCUMENTS

GB          1600273 A  * 10/1981  .............. G02B 5/14

* cited by examiner

*Primary Examiner* — Mike Stahl
(74) *Attorney, Agent, or Firm* — Novak Druce Connolly Bove + Quigg LLP

(57) ABSTRACT

An optical fiber connector includes a main body and a fixing element. The main body includes a front surface and a rear surface opposite to the front surface. An extending portion extends from the rear surface. The main body defines at least one receiving hole and at least one receiving recess aligned with the at least one receiving hole. The extending portion defines a first receiving space communicating with the at least one receiving recess. The fixing element is located on the extending portion and defines a second receiving space corresponding to the first receiving space.

8 Claims, 4 Drawing Sheets

OPTICAL FIBER CONNECTOR

BACKGROUND

1. Technical Field

The present disclosure relates to optical fiber connectors, and particularly to an optical fiber connector preventing damage of optical fibers of an optical fiber cable.

2. Description of the Related Art

Optical fiber cables generally include a plastic layer and a number of optical fibers received within the plastic layer. A portion of the optical fibers are exposed from the optical fiber cable and are received in an optical fiber connector. However, as the portion of the optical fibers covered by the plastic layer is not received in the optical fiber connector, a portion of the optical fibers adjacent to the plastic layer is exposed to the air. Thus, the optical fibers are easily damaged.

Therefore, it is desirable to provide an optical fiber connector to overcome the limitations described.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Embodiments of the disclosure will be described with reference to the drawings.

Figure 1:
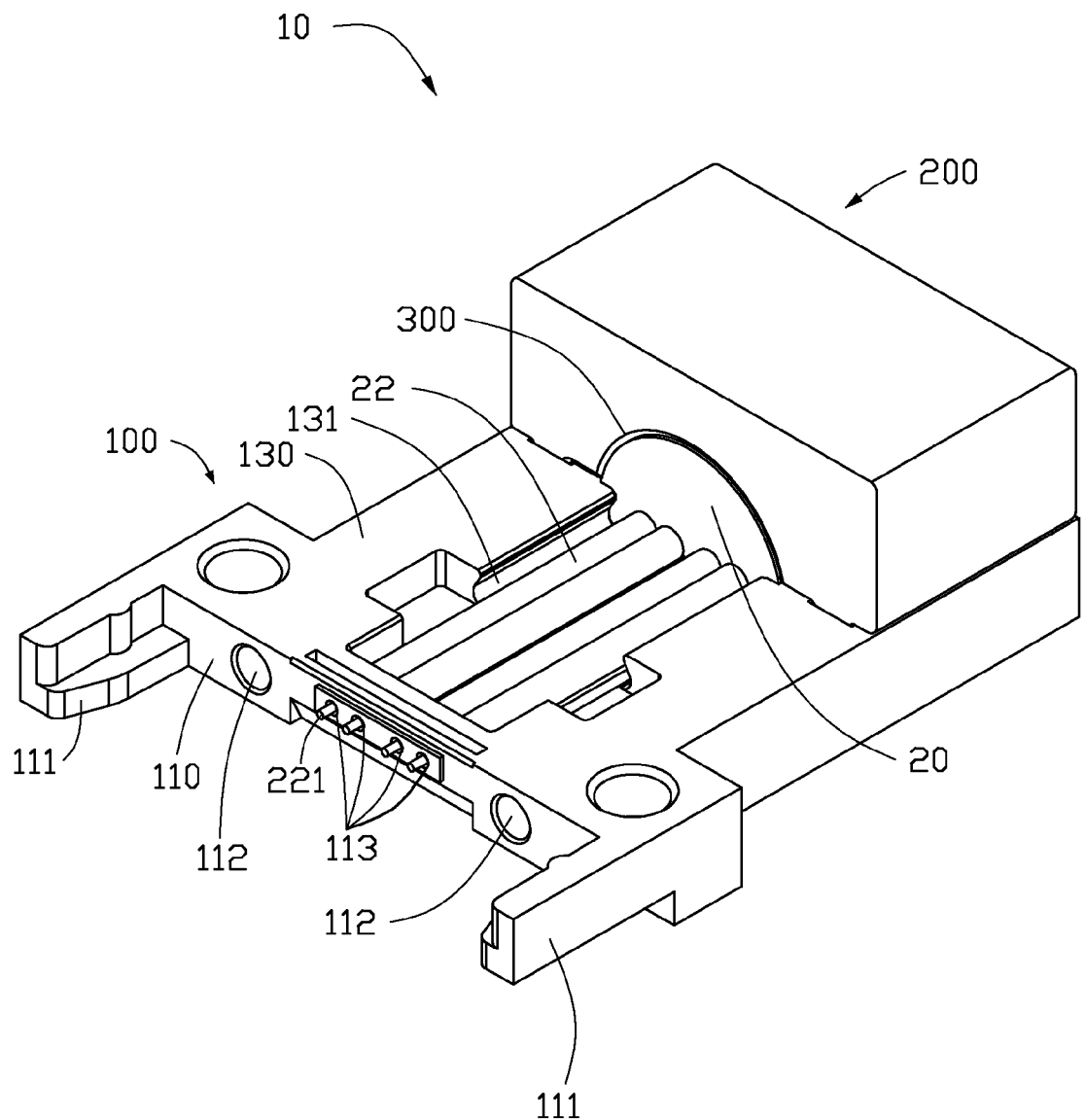
FIG. 1 is an assembled view of an embodiment of an optical fiber connector.
Figure 2:
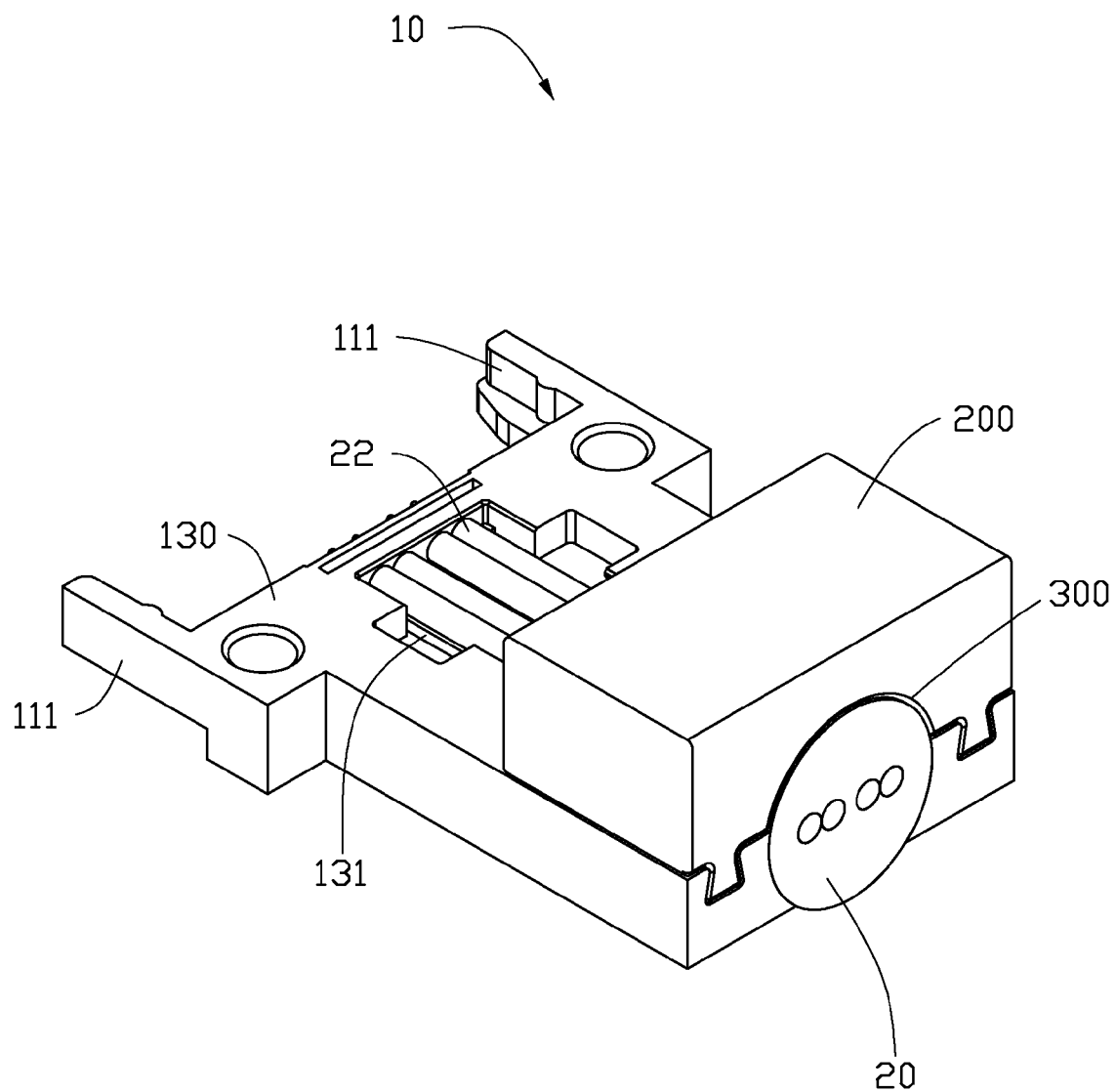
FIG. 2 is similar to FIG. 1, but viewed from another angle.
Figure 3:
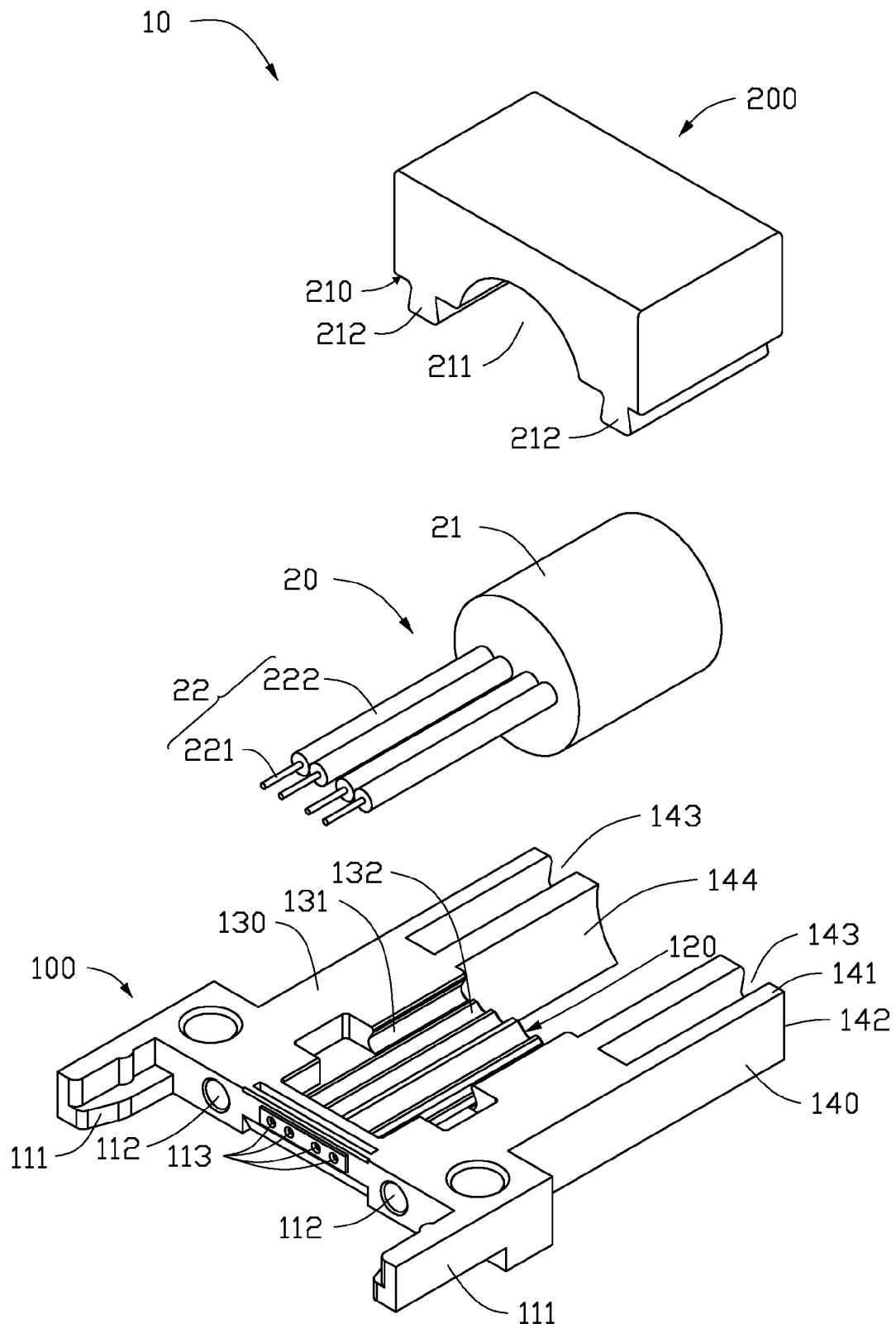
FIG. 3 is an isometric, exploded view of the optical fiber connector of FIG. 1.
Figure 4:
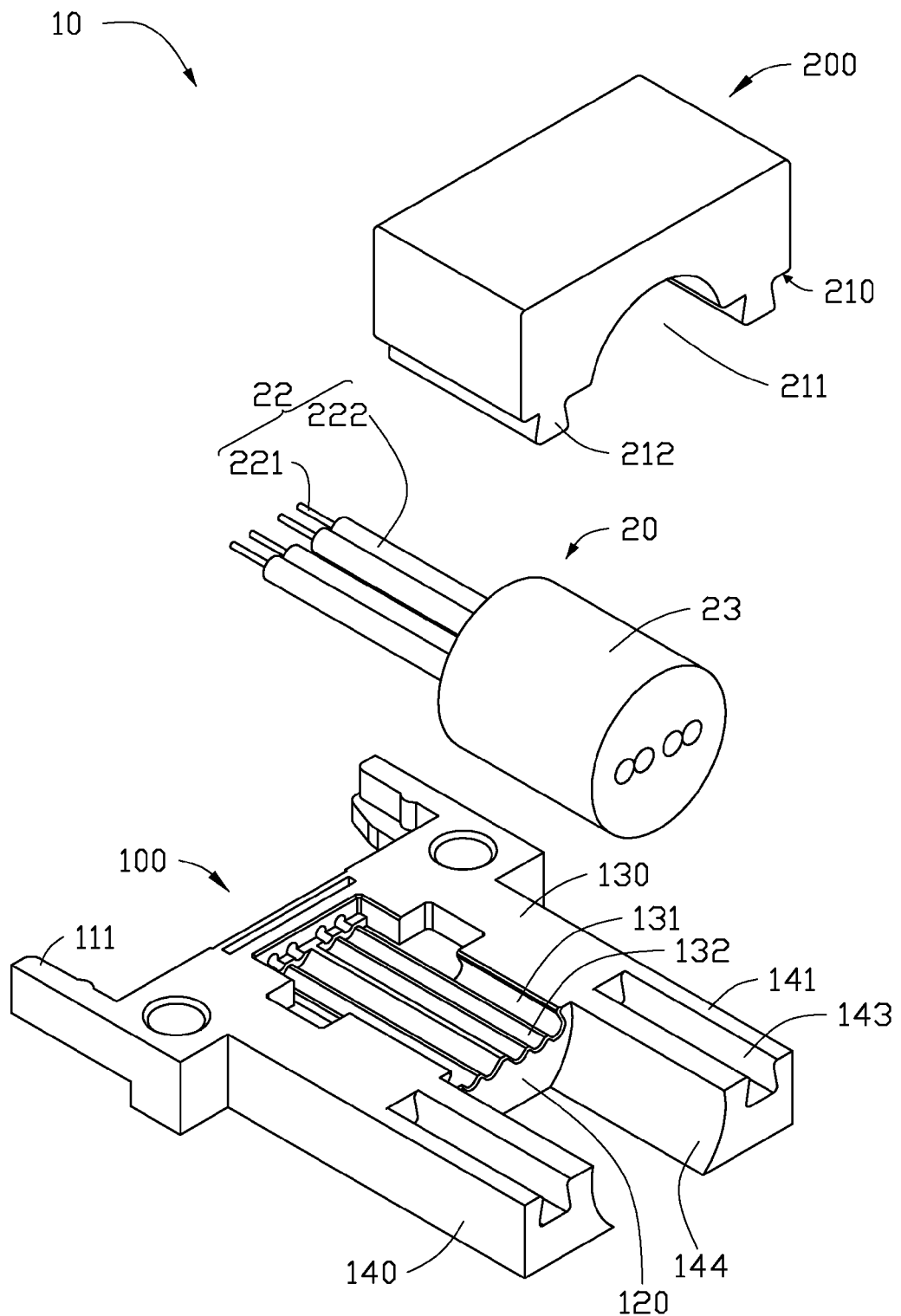
FIG. 4 is similar to FIG. 3, but viewed from another angle.

FIGS. 1-4 show an embodiment of an optical fiber connector 10. The optical fiber connector 10 is configured for receiving an optical fiber cable 20. The optical fiber cable 20 includes a plastic layer 21 and a number of optical fibers 22 received within the plastic layer 21. Each optical fiber 22 includes a fiber core 221 and a cladding layer 222 covered around the fiber core 221.

The optical fiber connector 10 includes a main body 100 and a fixing element 200 detachably connected to the main body 100.

In one embodiment, the main body 100 is transparent and includes a front surface 110, a rear surface 120 opposite from the front surface 110, and a top surface 130 connected substantially perpendicularly between the front surface 110 and the rear surface 120.

Two fixing arms 111 extend substantially perpendicularly from the front surface 110. The two fixing arms 111 are adjacent to respective side surfaces (not label) connected substantially perpendicularly to the front surface 110 and the rear surface 120, and configured for fixing a photoelectric converting module (not shown).

The main body 100 defines a number of positioning recesses 112 and a number of receiving holes 113 in the front surface 110. The receiving holes 113 are defined between the positioned recesses 112. The positioning recesses 112 receive positioning protrusions (not shown) of the photoelectric converting module. An internal diameter of each receiving hole 113 is substantially equal to an external diameter of the corresponding fiber core 221.

The main body 100 defines a first recess 131 in the top surface 130. The first recess 131 extends to the rear surface 120. The receiving holes 113 communicate with the first recess 131. A number of receiving recesses 132 is defined in a bottom surface of the first recess 131. Each receiving recess 132 extends along a direction substantially perpendicular to the front surface 110, and is aligned with one corresponding receiving hole 113. An internal diameter of the receiving recess 132 is equal to or slightly greater than an external diameter of the optical fibers 22, and is greater than an internal diameter of the receiving hole 113.

It should be understood that a number of the receiving holes 113 is equal to a number of the receiving recesses 132 and a number of the optical fibers 22.

An extending portion 140 extends substantially perpendicularly from the rear surface 120. The extending portion 140 includes an upper surface 141 substantially coplanar with the top surface 130, and an end surface 142 substantially parallel to the rear surface 120. The extending portion 140 defines two fixing recesses 143 in the upper surface 130. Each fixing recess 143 extends to the end surface 142 and extends along a direction substantially perpendicular to the rear surface 120. A width of the fixing recess 143 decreases from a bottom surface (not labeled) of the fixing recess 143 to the upper surface 141.

The extending portion 140 defines a first receiving space 144 between the two fixing recesses 143. The first receiving space 144 communicates with the first recess 131 and the receiving recesses 132. A cross-section of the first receiving space 144 is substantially semi-circular in a direction parallel to the end surface 142. An internal diameter of the first receiving space 144 is substantially equal to an external diameter of the optical fiber cable 20, and greater than an internal diameter of the receiving recess 132.

In one embodiment, the fixing element 200 is substantially rectangular and includes a lower surface 210. The fixing element 200 defines a second receiving space 211 in the lower surface 210. A cross-section of the second receiving space 211 is substantially semi-circular in a direction parallel to the end surface 142. An internal diameter of the second receiving space 211 is substantially equal to an external diameter of the optical fiber cable 20. Two fixing portions 212 extend from the lower surface 210. The second receiving space 211 is defined between the two fixing portions 212. A shape of each fixing portion 212 is substantially the same as a shape of the corresponding fixing recess 143.

It should be understood that the fixing recesses 143 can be defined in the fixing element 200, and the fixing portions 212 can be located on the extending portion 140. A number and a shape of the fixing recesses 143 and of the fixing portions 212 can be designed as needed.

In assembly, the fiber cores 221 of the optical fiber cable 20 are received through the corresponding receiving holes 113. The optical fibers 22 are received in the corresponding receiving recesses 132. The fixing portions 212 of the fixing element 200 are received in the fixing recesses 143. Thus, the first receiving space 144 and the second receiving space 211 cooperatively define a cylindrical space 300 to receive the optical fiber cable 20. A glue is injected into the first recess 131, thus fixing the optical fibers 22 in the optical fiber connector 10.

In the embodiment, because the optical fibers 22 and the optical fiber cable 20 are received in the optical fiber connector 10, thus a portion of the optical fibers 22 adjacent to the plastic layer 21 will not expose to the air.

Particular embodiments are shown and are described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical fiber connector, comprising:
   a main body comprising a front surface and a rear surface opposite to the front surface, two fixing arms extending from the front surface along a direction perpendicular to the front surface, an extending portion extending from the rear surface; the main body defining at least one receiving hole and at least one receiving recess aligned with the least one receiving hole, the extending portion defining a first receiving space communicating with the at least one receiving recess; and
   a fixing element positioned on the extending portion, and defining a second receiving space corresponding to the first receiving space.

2. The optical fiber connector of claim 1, wherein the first receiving space and the second receiving space cooperatively define a cylindrical space.

3. The optical fiber connector of claim 2, wherein a cross-section of the first receiving space is semi-circular, and a shape of the second receiving space is the same as a shape of the first receiving space.

4. The optical fiber connector of claim 1, wherein the extending portion comprises an upper surface, and defines at least one fixing recess in the upper surface; the fixing element comprises a lower surface and at least one fixing portion extending downward from the lower surface; the at least one fixing portion is received in the at least one fixing recess.

5. The optical fiber connector of claim 1, wherein an internal diameter of the at least one receiving recess is greater than an internal diameter of the at least one receiving hole.

6. The optical fiber connector of claim 1, wherein an internal diameter of the first receiving space is greater than an internal diameter of the at least one receiving recess.

7. The optical fiber connector of claim 1, wherein the at least one receiving hole is defined in the front surface, the main body comprises a top surface connected between the front surface and the rear surface, the main body defines a first recess in the top surface, the at least one receiving hole communicates with the first recess.

8. The optical fiber connector of claim 7, wherein the at least one receiving recess is defined in a bottom of the first recess.

* * * * *